United States Patent [19]

Darsow et al.

[11] 3,929,901
[45] Dec. 30, 1975

[54] DIHALOPHENYL-BIS-(HYDROXYARYLETHERS)

[75] Inventors: Gerhard Darsow, Krefeld-Uerdingen; Ludwig Bottenbruch, Krefeld-Bocku; Hermann Schnell, Krefeld-Uerdingen, all of Germany

[73] Assignee: Bayer Aktiengesellschaft, Germany

[22] Filed: July 19, 1973

[21] Appl. No.: 380,701

Related U.S. Application Data

[63] Continuation of Ser. No. 228,345, Feb. 22, 1972, abandoned, which is a continuation of Ser. No. 825,398, May 16, 1969, abandoned.

[30] Foreign Application Priority Data
June 1, 1968   Germany............................ 1768595

[52] U.S. Cl. ...... 260/607 A; 260/613 R; 260/609 F; 260/591; 260/45.95
[51] Int. Cl.².................. C07C 147/06; C07C 43/22
[58] Field of Search........................ 260/613, 607 A

[56] References Cited
UNITED STATES PATENTS
3,287,421   11/1966   Fox.................. 260/613 R
FOREIGN PATENTS OR APPLICATIONS
1,199,895   7/1970   United Kingdom............. 260/613 R
1,189,050   3/1959   France............................ 260/613 R Primary Examiner—Bernard Helfin
Attorney, Agent, or Firm—Connolly and Hutz

[57] ABSTRACT
Compounds of the formula (I)

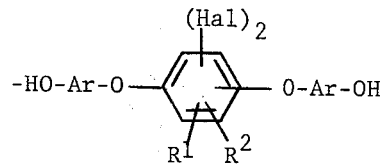

in which $R^1$ and $R^2$ denote hydrogen or identical or different alkyl or alkoxy radicals with 1 – 4 carbon atoms; Hal is chlorine, fluorine or bromine; and Ar is phenylene, naphthylene, diphenylene or a polynuclear aromatic radical of the formula (II)

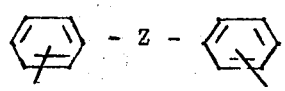

where Z denotes a bivalent aliphatic, cycloaliphatic or araliphatic radical with 1 – 8 carbon atoms or —O—, —S—, —SO—, —SO₂— or —CO— and the aromatic nuclei may carry 1 – 4 alkyl or alkoxy groups with 1 – 4 carbon atoms or halogen atoms, prepared by reacting 1 mol of a tetrahalobenzene of the formula (III)

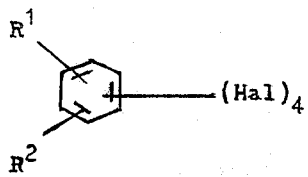

with 2 mols of a dialkali metal phenolate of the formula (IV)

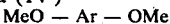

in which Me denotes an alkali metal, in a polar organic solvent at temperatures between about 60° C and about 180° C, preferably between about 90° C and about 160° C, and acidifying the reaction mixture and their utility for rendering unsaturated polyester resins and epoxide resins barely inflammable.

6 Claims, No Drawings

DIHALOPHENYL-BIS-(HYDROXYARYLETHERS)

CROSS-REFERENCE TO RELATED APPLICATIONS

This application is a continuation of application Ser. No. 228,345 filed Feb. 22, 1972, and now abandoned, which, in turn, is a continuation of application Ser. No. 825,398 filed May 16, 1969 and now abandoned.

The object of the invention comprises dihalophenyl-bis-(hydroxyarylethers) of the formula (I)

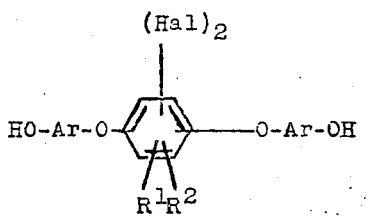

in which $R^1$ and $R^2$ denote hydrogen or identical or different alkyl or alkoxy radicals with 1 – 4 carbon atoms; Hal is chlorine, fluorine or bromine; and Ar is phenylene, naphthylene, diphenylene or a polynuclear aromatic radical of the formula (II)

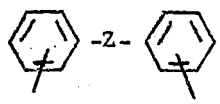

where Z denotes a bivalent aliphatic, cycloaliphatic or araliphatic radical with 1 – 8 carbon atoms or —O—, —S—, —SO—, —SO$_2$— or —CO— and the aromatic nuclei may carry 1 – 4 alkyl or alkoxy groups with 1 – 4 carbon atoms or halogen atoms.

Examples of such compounds are:
1,4-bis-(4-hydroxy-phenoxy) -2,5-dichlorobenzene
1,3-bis-(4-hydroxy-phenoxy) -2,4-dichlorobenzene
1,3-bis-(4-hydroxy-phenoxy) -2,5-dichlorobenzene
1,4-bis-(3-hydroxy-phenoxy) -2,5-dichlorobenzene
1,4-bis-[4-(4-hydroxy-phenyl-isopropyl)-phenoxy] -2,5-dichlorobenzene
1,3-bis-[4-(4-hydroxy-phenyl-sulphone) -phenoxy]-2,4-dichlorobenzene
1,4-bis-[4-(4-hydroxyphenyl) -phenoxy]-2,5-dichlorobenzene
1,4-bis-[4-hydroxy-phenyl-isopropyl) -phenoxy]-2,5-dibromobenzene
1,4-bis-[4-(4-hydroxy-phenyl-isopropyl) -phenoxy]-2,4-difluorobenzene.

The new halogen-containing aryl ethers are crystalline or amorphous, usually colourless substances which melt at between about 50° and about 250°C and are soluble in solvents such as methanol, ethanol, acetone, dioxan, dimethyl formamide and dimethyl sulphoxide. They can be added to synthetic materials, for example, unsaturated polyester resins and epoxide resins, e.g. in amounts of about 5 to about 20 per cent by weight, in order to render them barely inflammable.

These new compounds can be prepared according to the invention by reacting 1 mol of a tetrahalobenzene of the formula (III)

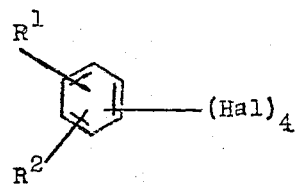

with 2 mols of a dialkali metal phenolate of the formula (IV)

MeO — Ar — OMe in which Me denotes an alkali metal, in a polar organic solvent at temperatures between about 60°C and about 180°C, preferably between about 90°C and about 160°C, and acidifying the reaction mixture.

Only two of the 4 halogen atoms of the tetrahalobenzene react during this operation. If the tetrahalobenzene contains different halogen atoms, these react in the order fluorine, chlorine, bromine.

Examples of tetrahalobenzenes are: 1,2,4,5-tetrachlorobenzene, 1,2,3,5-tetrachlorobenzene, 1,2,3,4-tetrachlorobenzene, 1,2,4,5-tetrachloro-3,6-dimethylbenzene, 1,2,4,5-tetrafluorobenzene, 1,2,4,5-tetrabromobenzene; furthermore, tetrahalobenzenes with different halogen atoms, e.g. 1,3-difluoro- 4,6-dichlorobenzene, 1,4-dibromo-2,5-dichlorobenzene, 1,4-difluoro-2,5-dibromobenzene.

Examples of dihydric phenols are: hydroquinone, resorcinol, dihydroxydiphenyls and dihydroxy-naphthalenes as well as bisphenols of the formula (V)

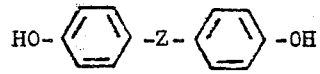

in which Z denotes a bivalent aliphatic, cycloaliphatic or araliphatic radical with 1 – 8 carbon atoms or —O—, —S—, —SO—, —SO$_2$—, or —CO—.

Examples of bisphenols of this type are: bis-(4-hydroxyphenyl)-methane, 1,1-bis-(4-hydroxyphenyl)-cyclohexane, bis-(4-hydroxyphenyl)-phenyl-methane, 4,4'-dihydroxydiphenyl ether, sulphide, sulphoxide, benzophenone, but, in particular, 2,2-bis-(4-hydroxyphenyl)-propane and 4,4'-dihydroxydiphenyl-sulphone.

The aromatic nuclei of the dihydric phenols may contain further substituents, besides the hydroxyl groups, for example, alkyl and alkoxy groups with 1 – 4 carbon atoms and halogen atoms, with the proviso that these substituents do not impair the reactivity of the hydroxyl groups by steric or any other hindrance.

Suitable cations for the diphenolates are those of the metals of the first main group of the Periodic System. The sodium and potassium salts are preferred.

Examples of suitable polar organic solvents are diethyl sulphoxide, dimethyl sulphone, diethyl sulphone, diisopropyl-sulphone and tetramethyl-sulphone, but preferably dimethyl sulphoxide (DMSO).

The dialkali metal salts of the diphenols can be prepared, before the condensation reaction, by known methods by reacting the diphenol concerned in an inert organic solvent with the corresponding alkali metal, alkali metal alcoholate or alkali metal hydroxide and subsequently distilling off the solvent with the alcohol or water liberated in the course of the salt formation.

However, it is simpler and more expedient for the subsequent condensation to prepare the dialkali metal phenolates in situ by causing the salt formation and the condensation with the tetrahalogen compound in the presence of the polar solvent to proceed simultaneously or successively.

For this purpose, molar amounts of the tetrahalogen compound are dissolved with twice the molar amounts of the diphenol in a sufficient amount of the polar solvent, the stoichiometric amount of alkali metal hydroxide is added in solid form or as a concentrated aqueous solution, and the mixture gradually heated to the reaction temperature in an inert gas atmosphere, e.g. under nitrogen. Depending on the reaction temperature and the water content of the mixture, the reaction time amounts to about 2 – 20 hours. After cooling, the reaction mixture is mixed with acidified water whereupon the reaction product separates and can be isolated. Any impurities can be removed by reprecipitation, washing out or recrystallisation from a suitable solvent.

If the tetrahalobenzene is liable to sublimation, only the diphenol and the alkali metal hydroxide are first dissolved in the polar solvent, while heating, this mixture is cooled to room temperature, the tetrahalobenzene is added and the mixture is then slowly heated with stirring to the reaction temperature. It is also possible to work in such a case under an inert gas pressure of 1 – 2 atmospheres. To achieve high yields and to reduce the reaction time, it may be advantageous to keep the water content of the reaction mixture low during the condensation of the dialkali metal phenolate with the tetrahalobenzene. To this effect, the diphenol is dissolved in a sufficient amount of the polar solvent, the stoichiometric amount of alkali metal hydroxide is added in solid form or as a concentrated aqueous solution, and the mixture is heated for some time, for example, 2 – 6 hours, under an inert gas at about 110° to about 150°C, while the water which is present or liberated during the phenolate formation is substantially distilled off from the mixture, expediently with the use of a carrying agent, such as benzene, toluene, xylene or chlorobenzene. Subsequently, the tetrahalogen compound is added, and the condensation reaction is then carried out, for example, by heating at the aforesaid reaction temperatures for one-half to 8 hours.

Another simple method of substantially removing the water from the reaction mixture consists in dissolving the diphenol and the alkali metal hydroxide in a sufficient amount of the polar organic solvent while heating, and subsequently distilling off about 10 – 20 per cent by volume of the polar solvent, expediently in a vacuum, before adding the tetrahalogen compound. The water is thus distilled off from the reaction mixture azeotropically with the partial amount of the polar solvent. The tetrahalogen compound is then added, and condensation sets in when heating is continued.

EXAMPLE 1

1,4-bis-[4-(4-hydroxyphenyl-isopropyl)-phenoxy]-2,5-dichlorobenzene

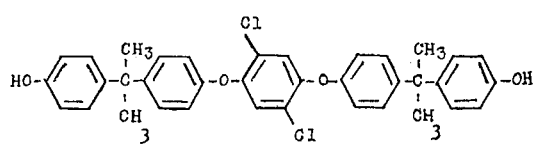

114.1 g (0.5 mol) 2,2-bis-(4-hydroxyphenyl)-propane (bisphenol A) and 40 g (1 mol) sodium hydroxide are dissolved in 600 ml dimethyl sulphoxide while heating in an inert gas atmosphere (nitrogen). 150 ml benzene are added and the mixture is heated at 110°–120°C for 6 hours. During this operation, the water present in the reaction mixture is distilled off azeotropically with the benzene into a water separator while the benzene flows back into the mixture. After removing the water, the reaction mixture is allowed to cool to 70°C, and 54.0 g (0.25 mol) 1,2,4,5-tetrachlorobenzene are added. Heating is continued for 2 hours with reflux of the benzene. The benzene is then distilled off, and the mixture is allowed to react at 150° – 160°C for a further 6 hours. Finally, the resultant reaction product is precipitated in the form of a snow-white powder by pouring the mixture into acidified water. After filtering off, washing until neutral and drying, a yield of 145 g is obtained. If the product is coloured, it can be recrystallised with active charcoal from a mixture of glacial acetic acid and water or of dioxan and water. Small portions of a higher degree of condensation can be removed by reprecipitation from a dilute sodium hydroxide solution. The product melts at 96° – 98°C.

| Elementary analysis: | | C | H | O | Cl | % by weight phenolic OH: |
|---|---|---|---|---|---|---|
| | calc. | 72.0 | 5.4 | 10.7 | 11.9 | calc. 5.3 |
| $C_{36}H_{32}O_4Cl_2$ | found | 71.5 | 5.4 | 10.8 | 11.9 | found 5.4 |

EXAMPLE 2

1,3-bis-[4-(4-hydroxyphenyl-isopropyl)-phenoxy]-2,4-dichlorobenzene

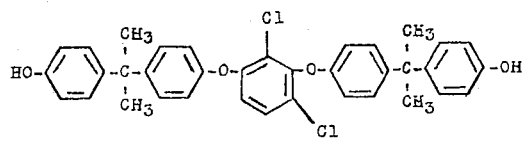

45.6 g (0.2 mol) 2,2-bis-(4-hydroxyphenyl)-propane and 16 g (0.4 mol) sodium hydroxide are dissolved in 300 ml dimethyl sulphoxide while heating. 21.6 g (0.1 mol) 1,2,3,4-tetrachlorobenzene are subsequently added with stirring. The reaction mixture is heated at 120° – 140°C for 16 hours and subsequently poured into acidified water. The resultant white powder is taken up in a dilute sodium hydroxide solution while heating, filtered and precipitated by pouring the mixture into acidified water. After filtering off, washing until neutral and drying, a yield of 48 g is obtained. The white powder melts at 101° – 102°C.

| Elementary analysis | | C | H | O | Cl | % by weight phenolic OH: |
|---|---|---|---|---|---|---|
| | calc. | 72.0 | 5.4 | 10.7 | 11.9 | calc. 5.3 |
| $C_{36}H_{32}O_4Cl_2$ | found | 71.2 | 5.4 | 10.7 | 11.7 | found 5.5 |

EXAMPLE 3

1,4-bis-[4-(4-hydroxyphenyl-isopropyl)-phenoxy]-2,5-dibromobenzene

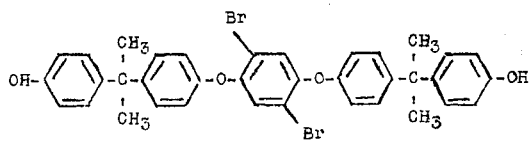

114.1 g (0.5 mol) 2,2-bis-(4-hydroxyphenyl)-propane and 64.55 g (1 mol) of 86.9% aqueous potassium hydroxide are dissolved in 700 ml dimethyl sulphoxide. Nitrogen is blown through the reaction vessel, and 100 ml dimethyl sulphoxide are distilled off in a vacuum. The water present in the reaction system is thus almost completely removed. After cooling to 60°C, 98.5 g (0.25 mol) 1,2,4,5-tetrabromobenzene are added and the reaction mixture is heated under normal pressure at 130° – 140°C for 8 hours. When the condensation is completed, the reaction product is precipitated by stirring the mixture into acidified water. It is reprecipitated twice from a dilute sodium hydroxide solution for purification. After filtering off, washing until neutral and drying, 128 g of a white powder of melting point 80° – 81°C are obtained.

| Elementary analysis | | C | H | O | Br | % by weight phenolic OH: | |
|---|---|---|---|---|---|---|---|
| $C_{36}H_{32}O_4Br_2$ | calc. | 62.8 | 4.7 | 9.3 | 23.2 | calc. | 4.95 |
| | found | 62.1 | 4.6 | 9.1 | 22.9 | found | 4.9 |

EXAMPLE 4

1,3-bis-[4-(4-hydroxyphenyl-sulphone)-phenoxy]-2,4-dichlorobenzene

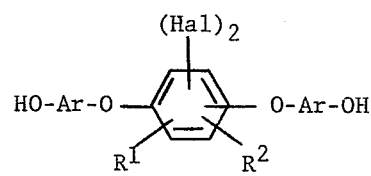

50.1 g (0.2 mol) 4,4'-dihydroxy-diphenylsulphone and 25.74 g (0.4 mol) of 87.2% aqueous potassium hydroxide are dissolved in 400 ml dimethyl sulphoxide. 175 ml benzene are added and the mixture is heated at 110° – 120°C for 2 hours. After removing the water, the reaction mixture is allowed to cool to 70°C, and 21.6 g (0.1 mol) 1,2,3,4-tetrachlorobenzene are added. Heating is continued for 4 hours with reflux of the benzene, the benzene is distilled off and the reaction mixture is allowed to react for a further 4 hours at 140° – 150°C. The resultant reaction product is then precipitated by pouring the mixture into acidified water. The product is purified as described in Example 1. There are obtained 49 g of a beige-coloured powder of melting point 77° – 78°C.

| Elementary analysis | | C | H | O | Cl | S |
|---|---|---|---|---|---|---|
| $C_{30}H_{20}O_8S_2Cl_2$ | calc. | 56.0 | 3.1 | 19.9 | 11.0 | 10.0 |
| | found | 55.4 | 3.1 | 19.6 | 10.8 | 9.9 |
| % by weight phenolic OH: | | | | | calc. | 5.3 |
| | | | | | found | 5.2 |

EXAMPLE 5

1,4-bis-[4-(4-hydroxyphenyl-phenoxy]-2,5-dichlorobenzene

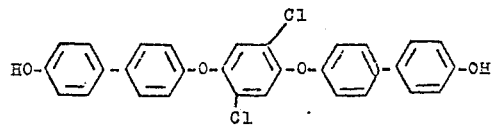

111.7 g (0.6 mol) 4,4'-dihydroxy-diphenyl and 77.5 g (1.2 mol) of 87% aqueous potassium hydroxide are dissolved in 500 ml DMSO and heated to 140°C. A solution of 64.8 g (0.3 mol) 1,2,4,5-tetrachlorobenzene is added dropwise to the hot mixture. After the addition of the chlorobenzene solution, the reaction mixture is heated at reflux temperature for 1 hour, and the chlorobenzene is then distilled off with the water present in the reaction mixture. Towards the end of the removal of the chlorobenzene, the temperature rises to 160° – 170°C. The resultant reaction product is subsequently precipitated by pouring the mixture into acidified water. The product is purified as described in Example 1. 141 g of a white powder of melting point 206° – 208°C are obtained.

| Elementary analysis | | C | H | O | Cl |
|---|---|---|---|---|---|
| $C_{30}H_{20}O_4Cl_2$ | calc. | 69.9 | 3.9 | 12.4 | 13.8 |
| | found | 69.8 | 3.9 | 12.5 | 13.7 |
| % by weight phenolic OH: | | | | calc. | 6.6 |
| | | | | found | 6.7 |

We claim:
1. Aryl ethers of the formula

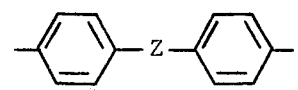

wherein $R^1$ and $R^2$ are hydrogen; Hal is chlorine or bromine; and Ar is selected from the group consisting of phenylene, diphenylene and wherein Z is 2,2-isopropylene or —SO$_2$—.

2. 1,4-bis-[4-(4-hydroxyphenyl-isopropyl)-phenoxy]-2,5-dichlorobenzene.

3. 1,3-bis-[4-(4-hydroxyphenyl-isopropyl)-phenoxy]-2,4-dichlorobenzene.
4. 1,4-bis-[4-(4-hydroxyphenyl-isopropyl)-phenoxy]-2,5-dibromobenzene.
5. 1,3-bis-[4-(4-hydroxyphenyl-sulphone)-phenoxy]-2,4-dichlorobenzene.
6. 1,4-bis-[4-(4-hydroxyphenyl-phenoxy]-2,5-dichlorobenzene.

* * * * *